Patented Oct. 10, 1939

2,176,027

UNITED STATES PATENT OFFICE 2,176,027

STABILIZING PREPARATION

Sidney Musher, New York, N. Y., assignor to Musher Foundation Incorporated, New York, N. Y., a corporation of New York No Drawing. Application January 9, 1939, Serial No. 249,990

11 Claims. (Cl. 99—150)

This application relates to the preparation of stabilizers useful for addition to aqueous oil emulsions and other aqueous materials containing organic materials or ingredients subject to oxidative deterioration to render them resistant to oxidation.

An object of this invention is the production of a substantially starch-free water soluble extract of a cereal having unexpected protective and stabilizing properties when used in connection with aqueous materials.

A further object is the production of protective and stabilizing products of low cost and high potency.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, the water soluble extract of a cereal flour is prepared and most desirably using an oat or maize product or products derived from them. Preferably the cereal such as maize or oats should be finely divided and raw or unbleached. The cereal may be dehulled but for normal commercial manufacture, the hulls may be allowed to remain as part of the cereal. The raw and unbleached by-products from the normal milling of oats or maize may also be employed for extraction purposes.

The cereal such as finely divided whole oats should be mixed or agitated thoroughly with a quantity of water for 10 seconds to 1 hour. The water used should be substantially free of minerals and desirably free of iron and copper. Any quantity of water may be used to produce a free flowing mixture. For example, 1 part of oats may be mixed with 9 parts of water by weight. Other proportions may also be used such as from 5 to 25 parts of water to every 1 part of oats. The oat flour suspension should then be subjected to thorough agitation, preferably for a period of about 30 minutes. It is desirable for the temperature of the water at the time of extraction to be about 135° F. although room temperature is also satisfactory. After a 30 minute agitation period the solution should desirably be cooled by placing it in a jacketed or coiled vat or by running water through cooling coils immersed therein so that the temperature of the water is reduced to from 70° F. to 100° F., and preferably to about 85° F.

It is not desirable for the extraction to be conducted at above 135° F. because of possibility of gelatinization of the starch present in the cereal at more elevated temperatures.

The solution thus cooled may then be treated to remove the undissolved starch, fibrous and other cereal portions. This may be accomplished by allowing the agitated mixture to settle for 2 to 12 hours or more until a clear supernatant liquor is formed which liquor is removed by decanting, siphoning or similar process.

The oat solution may also be subjected to a continuous centrifuging operation whereby all undissolved material is removed as a continuous operation.

The clear solution thus obtained should desirably be evaporated by vacuum distillation at 135° F. under 25 inches of vacuum, to approximately 25% to 75% total solids and desirably to about 50% solids and to a Baumé of 23°. After the proper solids content has been reached, the extract should desirably be subjected to superheated steam in the vacuum pan in order to raise the temperature of the extract to 200° F. for about 10 minutes in order to sterilize it and also retain its full stabilizing properties for longer periods.

The evaporating temperature may vary, dependent upon whether vacuum or atmospheric pressure is used. Although it is desirable to use vacuum evaporation, evaporation at atmospheric pressure may also be employed.

The extract thus obtained will be of dark brown or tan color, comparatively solid at 75° F. and liquid at 110° F., flowing freely at that temperature.

It is not desirable to dry down to in excess of 70% solids in order to avoid darkening, burning and caramelization of the extract.

In addition, it is not desirable to bring the extract thus obtained to complete dryness as by drum or roller drying as this also will produce burning, and the handling on the rolls is exceedingly difficult. Other means of drying by the use of special carriers may be employed, but it is preferable to use the concentrated material without bringing it to complete dryness. It is most desirable for purposes of extraction to use either an oat or a dry milled maize product as the cereal for extraction. Oats and maize will give an extract of substantially greater potency than the other cereals and the yield obtained will also be greater. In the case of oats, it is preferable to use finely divided whole oats with its full content of oat groats and hulls rather than oat flour. There may also less desirably be utilized the oat middlings and hulls or other residuary products obtained during the milling of the oats.

Where the drying of the water extract is essential, the extract may be mixed with milk, preferably skimmed, in concentrated form, and using from 10% to 60% of the extract and 90% to 40% of the milk, based on the solids weight, and then drying the ingredients together. The drying may be done preferably on a hot roll and the dried film scraped off after drying. Less preferably the mixture may be dried by spraying into a heated chamber.

Where a completely water soluble dried product is desired, the extract may be mixed with powdered or crystallized salt or sugar using from 5% to 40% of the extract and 95% to 60% of the salt or sugar and preferably applying the concentrated extract to the sugar or salt crystals by spraying such extract on the crystals while they are kept at above 180° F. and desirably at between 250° F. and 300° F. so that the extract dries on the surface of the crystals of the salt or sugar.

For example, as the salt crystals leave the kiln at 275° F., the extract of oats containing 50% water may be heated to 170° F. and sprayed on the salt crystals, applying 15% on the solids basis to the salt in this manner, thereby obtaining a completely water soluble product. In all cases the final extract should be free of starch, and cereal fibres.

The water extract of oats or maize thus obtained is extremely effective as a stabilizer for oil containing emulsions of the oil-in-water type and for other high aqueous containing materials.

*Example I*

To a cod liver oil-in-water emulsion containing 60% cod liver oil was added 1.0% of the concentrated water extract of finely divided whole oats (42% solids).

This extract was prepared by thoroughly mixing 10 parts by weight of water with 1 part by weight of finely divided whole oats at 135° F. cooling to 100° F., allowing to stand for 6 hours until the solid portion settled out, and then siphoning off the supernatant water portion and concentrating at 135° F. under vacuum of 25 inches to 22° Baumé.

The treated emulsion was compared with an untreated sample of the same emulsion held at 95° F.

|  | Comments after— | | |
| --- | --- | --- | --- |
|  | 10 days | 20 days | 30 days |
| Treated emulsion | O. K. | Slightly "off" | Slightly "rancid." |
| Untreated emulsion | Slightly "off" | Rancid | Very rancid. |

*Example II*

To milk susceptible to the development of oxidized flavor was added and thoroughly admixed 0.01% of the concentrated water extract of maize flour prepared as in Example I. The milk was compared with untreated milk by allowing it to stand at 50° F. and testing at regular intervals for oxidized flavor development. Results are given below, the number of + signs indicating the degree of oxidized flavor present.

|  | After— | | |
| --- | --- | --- | --- |
|  | 24 hours | 48 hours | 72 hours |
| Untreated milk | ± | + | ++ |
| Treated milk | − | − | ± |

Other emulsions may similarly be treated including aqueous dairy products, such as milk, cream, cream cheese, ice cream, etc., and such other emulsions as mayonnaise, salad dressings, etc.

It has been found that although the extract thus obtained has but little effectiveness when used with pure oils and fats such as with the essential oils, glyceride oils and hydrocarbon oils, it is extremely effective when used in aqueous materials maintaining the oil globules. The presence of the water extract in the continuous aqueous phase gives extremely marked protection to the fat phase although when added direct to the fat phase it is comparatively much less effective.

*Example III*

To lard was added 0.5% of the extract of maize flour made as in Example I and mixed in the lard as well as possible. This lard was then emulsified with water containing 2% of gum acacia (Emulsion A). Another lot of the same lard was made up into emulsified form and instead of adding the extract to the lard before emulsification, it was added following emulsification in the same amount of 0.5%, against the weight of the lard (Emulsion B). The emulsions were held at 95° F. and observed for rancidity.

|  | Comments after— | | |
| --- | --- | --- | --- |
|  | 1 day | 2 days | 3 days |
| Emulsion A | Slightly rancid | Rancid | Badly rancid. |
| Emulsion B | O. K. | Slightly rancid. | Rancid but much better than Emulsion A. |

Moreover, although the water extract of the cereal is as effective or more effective than the comparative amount of the original cereal used when added to aqueous products, the water extract when added to a pure oil or fat is much less effective and not at all comparable in effectiveness to the same quantity of the original flour.

*Example IV*

The water extract of oat flour was prepared using 1 pound of oat flour to 12 pounds of water, mixed at 110° F. for 15 minutes and then allowed to stand for 6 hours. After this time the supernatant water portion was siphoned off and concentrated under vacuum to a solids content of 50%. A yield of 6% was obtained. This concentrate was added to lard using 0.1% of the concentrate and thoroughly admixing the concentrate in the lard. Another sample of the same lard was prepared by mixing in it 1.67% of the oat flour. Both lards were allowed to stand at 98° F. and peroxide values taken at regular intervals until rancidity was observed.

|  | Peroxide values after— | | | | |
|---|---|---|---|---|---|
|  | 2 days | 4 days | 6 days | 8 days | 10 days |
| Lard containing concentrate | 3.6 | 19.8 | 39.0 | 130 |  |
| Lard containing oat flour | 2.4 | 12.5 | 17.0 | 24.5 | 65.0 |

When the extract is added, however, to an aqueous emulsion, and that emulsion subsequently broken as when cream is churned into butter, the protective effect originally exerted upon the emulsion, in this case the cream, is carried with the fat or oil, in this case the butter, to stabilize it.

*Example V*

To a 35% butterfat containing cream was added 0.2% of the concentrated water extract of finely divided whole oats, this percentage being based upon the solids weight of the concentrate and against the butterfat weight of the cream. The cream was then churned into butter and the butter was stored at 50° F. and scored at regular intervals. Butter manufactured from untreated cream was stored in the same manner and scored as above.

|  | Score after— | | | |
|---|---|---|---|---|
|  | 0 weeks | 3 weeks | 6 weeks | 9 weeks |
| Butter made from cream containing concentrate | 91.0 | 90.5 | 90.0 | 89.5 |
| Butter made from untreated cream | 91.0 | 90.0 | 89.5 | 88.5 |

The extract may also be used for the essential oil containing aqueous materials such as for beverages, orange or lemon drinks, concentrates, ginger ale, etc., in all of which cases it acts in the same manner as referred to immediately above.

*Example VI*

To orange concentrate prepared by evaporating orange juice under vacuum to a viscous consistency was added 0.1% of the concentrated water extract of maize flour. The concentrate was allowed to remain at room temperature for 30 days and compared with similar concentrate obtained from the same lot except that it did not contain the water extract of maize flour present. At the end of 30 days the treated orange concentrate retained substantially its original flavor whereas the untreated concentrate was noticeably off and had lost a good part of its original fresh flavor.

For these purposes, from 0.005% to 2.0% by weight of the extract may be added to the materials it is desired to stabilize and a marked protective effect will be obtained.

This extract is also of value for stabilizing the oil or fat content of cured materials when used together with salt or other curing agent. The extract may either be dried with salt as previously indicated or the extract may be added to the brine or liquor used for the curing operation or with the dry curing ingredients.

When used for curing purposes, the extract should desirably be employed for addition with the curing materials at the time of the first curing operation. For example, where mackerel or other fishery product is first cured for a short period and then repacked in fresh brine, the extract should desirably be used at the time of the first curing operation.

It is desirable to use from 0.2% to 10% of the extract against the weight of the salt or other curing ingredients in these curing mixtures.

*Example VII*

Mackerel fillets were prepared by splitting the mackerel so that one side could be treated and directly compared with the other side of the same mackerel left in untreated form. In this manner a number of mackerel fillets were cured with salt only and compared with the opposite sides of the mackerel which were cured with a mixture comprising 96% salt and 4% of the concentrated water extract of maize flour brought to a 40% solids concentration. In each case the fillets were held in the salt for 30 days at room temperature and were then repacked in fresh brine. The observations were made after the repacking period.

|  | After— | | |
|---|---|---|---|
|  | 1 month | 2 months | 3 months |
| Untreated fillets | Fishy, slightly rancid. | Rancid. | Rancid and slightly putrid. |
| Treated fillets | O. K. | O. K. | Fishy, slightly rancid. |

In a similar manner, any meat or fishery product may be cured such as bacon, hams, salmon, sardines, tuna, meat for sausage manufacture, fat backs, corned beef, etc. In addition, such other materials as olives, fruits, vegetables, etc., may similarly be cured, the extract exerting its effectiveness particularly upon the fixed or essential oil present although it is comparatively much less effective when added direct to the oil.

The extract may also be added direct to oil or fat containing materials such as to sausage, gravies, etc.

In the case of butter, the extract may be added to the wash water or churned with the butter and the water in contact with the butter will show some effectiveness. The most desirable procedure, however, is to add the extract to the cream before the emulsion is broken and the butter churned.

It has also been observed that particularly when the extract is subjected to an elevated temperature at the time of use in connection with the material requiring stabilization, marked acceleration of the stabilizing process is obtained.

The extract should desirably be subjected to a temperature of 145° F. or more and most desirably of from 165° F. to 250° F. or more.

For example, the concentrated water extract of finely ground oats, when added to cream, and that cream subjected to an elevated temperature is considerably improved in keeping quality over the same cream not heated with the concentrated extract. In addition, the butter made from that heat treated cream containing the extract is similarly improved in keeping quality.

*Example VIII*

To a 35% cream was added 0.1% of the concentrated water extract of finely divided whole oats brought to a 50% solids concentration. The cream was then heated to 175° F. for 10 minutes and placed into storage at 0° F. (Cream A). From the same cream another lot was prepared which was heated to 175° F. for 10 minutes before addition of the concentrate and then the concentrate added in the same proportion as before (Cream B). The creams were tested for oxidized flavor development after storage.

|  | Observations after— | | |
|---|---|---|---|
|  | 0 months | 3 months | 5 months |
| Cream A | − | − | ± |
| Cream B | − | + | ++ |

Example IX

Lots of the cream used in the above experiment were after treatment as above, churned into butter and the butter thus obtained was stored at 50° F. and scored at designated intervals.

|  | Score after— | | | |
|---|---|---|---|---|
|  | 0 weeks | 3 weeks | 6 weeks | 9 weeks |
| Butter made from Cream A | 90.5 | 90.5 | 90.0 | 89.25 |
| Butter made from Cream B | 90.5 | 90.0 | 89.5 | 88.5 |

It has also been found that the concentrated water extract of oats or maize is considerably more effective than the same relative amount of the original oats or maize, particularly when subjected to elevated temperatures. Therefore, it is desirable to use the concentrated extract in preference to the original cereal in order to obtain the most marked effectiveness.

Example X

To one lot of cream containing 32% butterfat was added 0.2% of the concentrated water extract of finely divided whole oats from a lot which gave a yield of 10%. To another lot of the same cream was added the proportionate amount of the original finely divided whole oats, in this case amounting to 2.0%. Both creams were then heated to 180° F. for 1 minute and to each of those creams was added 3 p. p. m. of CuSO4. The creams were then held at 45° F. and observed at regular intervals for the development of oxidized flavor.

|  | Observations after— | | |
|---|---|---|---|
|  | 24 hours | 48 hours | 96 hours |
| Cream containing extract oats | − | − | − |
| Cream containing oats | − | ± | ++ |

It has furthermore been found that the unconcentrated water extract of oats and maize, for example, is far less desirable and shows much less effectiveness when used in aqueous materials that are subjected to elevated temperatures than the same relative amount of extract in concentrated form.

Example XI

To cream containing 30% butterfat was added in one case 0.2% of the concentrated water extract of finely divided whole oats. To another lot of the same cream was added 5% of the unconcentrated water extract of finely divided whole oats, which water contained the equivalent proportion of the water extract as in the previous case where 0.2% of the concentrated extract was present. Both lots of cream were then heated to 180° F. for 30 seconds. The creams were then stored at 0° F. and tested for tallowiness at regular intervals.

|  | After— | |
|---|---|---|
|  | 2 months | 4 months |
| Cream prepared with concentrated extract | − | ± |
| Cream prepared with unconcentrated extract | + | +++ |

Example XII

The above creams were also churned into butter following the heat treatment. The butters thus obtained were stored at 50° F. and scored at regular intervals.

|  | Score after— | | |
|---|---|---|---|
|  | 0 weeks | 3 weeks | 6 weeks |
| Butter made from cream containing concentrated extract | 92.0 | 91.5 | 90.5 |
| Butter made from cream containing unconcentrated extract | 92.0 | 91.25 | 89.75 |

There is in addition the desirable factor of using the concentrated extract in that it does not dilute the aqueous material such as milk, cream, beverages, etc. Since it is free of starch or water in soluble material, it also does not change the appearance of the aqueous material.

The application of elevated temperatures should be made to the aqueous product after the extract has been added to it and thoroughly dispersed therein. It is not desirable nor can the desired effect be obtained by heating the concentrated extract above and then adding such heated extract to the oxidizable aqueous material. When the extract is heated alone, no improvement is obtained over the unheated extract and frequently a reduction in antioxygenic activity is observed.

In a similar manner to that described above where the antioxygenic concentrate was used for cream and fruit juices before heating, it may similarly be utilized for addition to milk, ice cream, condensed or evaporated milk, frozen cream, cream cheese, or other form of dairy product before subjecting to a heat treatment of from 145° F. to 250° F. or higher.

The water soluble concentrated extract may also be used in all forms of fruit juices, fruit concentrates, beverages, vegetable juices, liquid egg yolk, egg white, soups, tomato juice, tomato catsup, jams and jellies, desserts and similar products.

It may also be used with aqueous materials that are subsequently dried as, for example, the extract may be added to liquid egg white before drying using from 0.005% to 1.0% against the weight of the liquid egg white and the heat developed during the drying operation will be sufficient to markedly increase the protective and stabilizing effect.

The extract may also be employed for spraying over meat and fishery products and particularly for fatty fish such as salmon, mackerel, herring, pilchards, etc. The extract may be warmed to about 120° F. so that it is free flowing and then sprayed on the surface of the fish to retard both rancidity and protein decomposition. Where desired, the fish may then be frozen, salted, canned or otherwise processed. The extract may also be diluted with brine or the salt extract combination referred to previously may be dissolved in water and then sprayed.

To obtain still greater stabilization of the sprayed meat or fishery product, it may be subjected to a flash surface heat either by conveying it under a direct flame for a fraction of a second to 2 seconds or by the application of superheated steam in order to scorch the surface, thereby producing further enhancement of antioxygenic effect.

When the concentrated extract is to be dried as by the use of salt, the salt that is employed should desirably be free of metallic impurities in order to avoid offsetting the antioxygenic properties of the extract. As an example of the use of the dried salt-extract combination, the following is given:

Example XIII

To a purified salt after leaving the kiln and while the salt was approximately 275° F., there was sprayed on the salt 7% of the concentrated water extract of finely divided whole oats, which extract contained 40% total solids. This extract at the time of spraying was held at 130° F. so that it was completely fluid and the spraying was done in such manner as to disperse the extract evenly over the salt crystals. The salt was then set aside for a period of 30 days at room temperature along with samples of salt prepared from the same batch but which did not contain any of the water extract. These salts were used in the curing of mackerel in the same manner as referred to in Example VII.

Observations were made on the fillets after the repacking period as indicated below:

After 2 months—
Fillets prepared with
   untreated salt_____Noticeably rancid.
Fillets prepared with
   treated salt_____In very good condition, not rancid.

As an example of the use of milk solids as a carrier for the water extract of oats or maize, the following is given:

Example XIV

A water extract of finely divided unbleached dry milled maize flour was prepared and dried down to a concentration of 35% solids. To this extract containing 35% solids was added concentrated skim milk also having approximately 35% solids. These were mixed in the proportion of 2 parts by weight of the concentrated milk to 1 part by weight of the extract. After thoroughly mixing, the mixture was run over a drum for drying of the milk-extract combination which was then used in powdered form.

To cream containing 35% total butterfat, and to which was added 3 p. p. m. of CuSO₄, was further added 0.2% by weight of the milk-extract combination. To another lot of the same cream containing the CuSO₄, no addition of the milk-extract combination was made. The creams were then heated to 175° F. for one minute, cooled, and then set aside at 50° F. for observations as to the development of oxidized flavors with the following results:

|  | After— | | |
| --- | --- | --- | --- |
|  | 48 hours | 72 hours | 96 hours |
| Untreated cream | + | +++ | ++++ inedible. |
| Treated cream | − | + | + |

Where it is desirable to obtain a more rapid precipitation of the protein materials contained in colloidal suspension, there may be used a small amount of acid such as acetic acid, sulphurous acid, etc., in the water at the time of extraction. There may also be used small amounts of enzyme material for the purpose of obtaining further clarification of the extract, which addition should desirably be made at the time of the extraction.

The residue obtained after removal of the extract may be dried by heating under vacuum to 125° F. or by passing over hot plates or other means. After drying, the residue has excellent value for animal feed or for use in the manufacture of starch or for other purposes where the water soluble portion removed as an extract would not be a requisite. For example, the residue that is obtained following the extraction of maize may be used directly in the manufacture of corn starch and by this means a large amount of the objectionable wash water which is accumulated in the normal manufacture of corn starch would be avoided by first removing the water extract according to this process. At the same time the residue will have as great if not greater value for the production of starch because to the extent that the extract has been removed from the original cereal, the total starch content will have been increased and rendered more valuable.

Where it is not desired to use the residue for feed purposes, a filter aid may be employed and the water containing the extract may be filtered from the residue by the use of such filter aid. It is difficult to filter the residue because of the caking of the residue on the filter press.

The dried residue still retains definite anti-oxidant properties when used in connection with pure oils and fats such as lard, cottonseed oil, soya bean oil, tallow, cod liver oil and the essential oils, even though its anti-oxidant properties with respect to the substantially aqueous materials described herein have been substantially eliminated. The residue may, therefore, be utilized as a stabilizer for oils or it may be subjected to further extraction as with hexane to remove ane type of extract, with alcohol to remove another type, etc.

Modification may be made in the use of water as a solvent as when minor proportions of other water soluble solvents are employed together with water in the extraction of the cereal. For example, there may be employed ethyl alcohol, acetone, glycerol, and other similar water miscible organic solvents together with water for the extraction of the oats or maize.

The cereals referred to may be preferably subjected to a degerminating process whereby the germ is removed by means of dry milling or less preferably the cereals may be utilized with the normal germ present. In addition, for purposes of this invention, the germs themselves may be employed, preferably in finely divided, raw and unbleached form and as obtained by a dry milling process.

Altho it has been proposed to use other solvents for the extraction of cereals, such as hexane, for example, no solvent other than water or a similar solvent yields an extract so markedly effective as a stabilizer for aqueous materials and so devoid of the pro-oxygenic substances frequently present in the extracted materials.

Although oats and maize are preferred for extraction, it is possible although less preferable to use in combination therewith or in lieu thereof other cereals and particularly barley or whole wheat, buckwheat, rye and tapioca may also be employed.

The present application is specifically directed to stabilizing aqueous or water containing food compositions with a water soluble extract of finely divided unbleached cereals. The copending application, Serial No. 229,664, filed September 13, 1938, is more broadly directed to stabilizing food compositions, whether aqueous or non-aqueous, with the alcohol or water soluble extracts of the unbleached cereals. The specific use of these extracts for stabilizing meat and fishery products is covered in application, Serial No. 229,296, filed September 10, 1938.

Having described my invention, what I claim is:

1. A water containing food composition subject to oxidative deterioration, said composition containing a sufficient amount, less than 5%, of a water soluble extract of a finely divided unbleached cereal to retard said deterioration.

2. A water containing food composition subject to oxidative deterioration, said composition containing a sufficient amount, less than 5%, of a water soluble extract of a finely divided unbleached cereal selected from the group consisting oats and maize to retard such deterioration.

3. An aqueous dairy food product subject to oxidative deterioration, said product containing a sufficient amount, less than 5%, of a water soluble extract of a finely divided unbleached cereal to retard said deterioration.

4. A dairy cream subject to oxidative deterioration, said cream containing a sufficient amount, less than 5%, of a water soluble extract of a finely divided unbleached cereal to retard said deterioration.

5. A method of stabilizing a water containing food composition subject to oxidative deterioration to render it resistant to such deterioration, which comprises adding thereto a sufficient amount, less than 5%, of a water soluble extract of a finely divided unbleached cereal.

6. A method of stabilizing aqueous food compositions subject to oxidative deterioration to render them resistant to such deterioration, which comprises adding thereto a small amount, less than 5%, of a concentrated water soluble extract of a finely divided unbleached cereal selected from the group consisting of oats and maize.

7. A method of making butter resistant to oxidative deterioration which comprises adding to a dairy cream a small amount, less than 5%, of a water soluble extract of a finely divided unbleached cereal and churning the cream to form the butter.

8. A water containing food composition subject to oxidative deterioration, said composition containing a sufficient amount, less than 5%, of an acidified water soluble extract of an unbleached antioxygenic cereal product to retard said deterioration.

9. A method of stabilizing a water containing food composition subject to oxidative deterioration to render it resistant to such deterioration, which comprises adding thereto a sufficient amount, less than 5%, of an acidified water soluble extract of an unbleached antioxygenic cereal product.

10. A water containing food composition subject to oxidative deterioration, said composition containing a sufficient amount, less than 5%, of an acidified water soluble extract of an unbleached antioxygenic maize to retard such deterioration.

11. A method of stabilizing aqueous food compositions subject to oxidative deterioration to render them resistant to such deterioration, which comprises adding thereto a small amount, less than 5%, of a concentrated acidified water soluble extract of an unbleached antioxygenic maize.

SIDNEY MUSHER.